(12) United States Patent
Hurd et al.

(10) Patent No.: US 8,351,509 B1
(45) Date of Patent: Jan. 8, 2013

(54) VIDEO CODEC SYSTEMS AND METHODS FOR OPTIMAL MOTION VECTOR WITH VARIABLE SIZE BLOCKS

(75) Inventors: Lyman Porter Hurd, Atlanta, GA (US); John H. Elton, Atlanta, GA (US)

(73) Assignee: Dimension, Inc., Las Vegas, NV (US)

( * ) Notice: Subject to any disclaimer, the term of this patent is extended or adjusted under 35 U.S.C. 154(b) by 886 days.

(21) Appl. No.: 12/341,964

(22) Filed: Dec. 22, 2008

Related U.S. Application Data

(60) Provisional application No. 61/015,809, filed on Dec. 21, 2007.

(51) Int. Cl.
*H04N 7/12* (2006.01)
(52) U.S. Cl. .................................. 375/240.16
(58) Field of Classification Search .............. 375/240.16
See application file for complete search history.

(56) References Cited

U.S. PATENT DOCUMENTS

| | | | | |
|---|---|---|---|---|
| 5,982,441 A | * | 11/1999 | Hurd et al. ................. | 348/417.1 |
| 6,084,908 A | * | 7/2000 | Chiang et al. ............ | 375/240.03 |
| 6,807,231 B1 | * | 10/2004 | Wiegand et al. ......... | 375/240.12 |
| 2006/0285596 A1 | * | 12/2006 | Kondo et al. ............ | 375/240.16 |
| 2008/0204592 A1 | * | 8/2008 | Jia et al. .................... | 348/402.1 |

\* cited by examiner

*Primary Examiner* — Jayanti K Patel
*Assistant Examiner* — Richard Torrente
(74) *Attorney, Agent, or Firm* — Todd Partners, P.C.; Jack D. Todd

(57) ABSTRACT

A codec, systems, and methods for compressing video data includes selecting a current video frame of the video data, dividing the current video frame into multiple blocks, wherein each block has M×N pixels, approximating the blocks of the current frame based on motion vectors associated with corresponding blocks from the previous frame, further refining the blocks of the current frame by determining optimal motion vectors for the blocks of the current frame based on the motion vectors provided (i) by the corresponding blocks from the previous frame, (ii) by the surrounding blocks in the current frame, and (iii) from successively smaller blocks within the current frame, wherein the optimal motion vectors for the blocks of the current frame are optimized to balance distortion and rate and wherein the optimal motion vectors are represented by codewords generated from Huffman tables.

11 Claims, 9 Drawing Sheets

CODEC WITH ENTROPY ENCODER

BASIC CODEC PROCESS

BASIC COMPRESSOR PROCESS

FRAME "BLOCKS"

ADJUSTMENT OF FRAME COMPRESSION BASED ON DESIRED RATE

CODEC WITH ENTROPY ENCODER

TYPICAL RATE-DISTORTION CURVE

CODE APPLICATION TO SINGLE FRAME

ITERATIVE MOTION VECTOR GENERATION

FRACTAL CODE PROCESSING

| Codeword | Index |
|---|---|
| 00 | 0 |
| 010 | 1 |
| 1000 | 2 |
| 1001 | 3 |
| 10100 | 4 |
| 10101 | 5 |
| 10110 | 6 |
| 10111 | 7 |
| 11000 | 8 |
| 11001 | 9 |
| 110100 | 10 |
| 110101 | 11 |
| 110110 | 12 |
| 110111 | 13 |
| 111000 | 14 |
| 111001 | 15 |
| 111010 | 16 |
| 111011 | 17 |
| 111100 | 18 |
| 1111010 | 19 |
| 1111011 | 20 |
| 1111100 | 21 |
| 1111101 | 22 |
| 1111110 | 23 |
| 1111111 | 24 |

FIG. 10
EXEMPLARY HUFFMAN TABLE OF CODEWORDS

VIDEO CODEC SYSTEMS AND METHODS FOR OPTIMAL MOTION VECTOR WITH VARIABLE SIZE BLOCKS

CROSS REFERENCE TO RELATED APPLICATION

This application claims the benefit under 35 U.S.C. §119 (e) of U.S. Provisional Patent Application No. 61/015,809, filed Dec. 21, 2007, and entitled "Improved Video Codec System and Methods," which is incorporated herein by reference as if set forth herein in its entirety.

TECHNICAL FIELD

The present systems and methods relate generally to compression and decompression of digital video data, files, or streams for purposes of storage, transmission, and the like, and more particularly to expressing digital video data, files, or streams in a resolution-independent compressed format, and decompressing the same in an efficient manner.

BACKGROUND

Digital video is pervasive in cable broadcasts, satellite television, Internet videos, and the like. Typically, video data is transmitted in frames, and each frame is represented as an array of pixel values. Generally, the pixel values are each divided into three, eight-bit values representing three color planes (usually red, green, and blue) comprising the components of the pixel displayed at that point. With the advent of high-definition videos, typical frame resolutions are often as high as 1920×1080 pixels (and will likely become even greater in the future). If three, eight-bit values are used to represent each pixel, a total of 49,776,400 bits of data are required to represent each frame in a high-definition video. Thus, due to the large volume of data associated with each video, transmitting uncompressed video data over conventional transmission media is highly impractical. Accordingly, systems and methods for compressing and decompressing video data are paramount to successful transmission and broadcasting of videos.

Generally, a "codec" is a device, processor, or computer program capable of encoding and/or decoding (i.e. compressing and/or decompressing) digital video data, files, streams, or signals. Video compression systems within traditional codecs transform the red, green, and blue (RGB) pixel values in each frame to a new color space, such as the luminance/chrominance color space (expressed in Y, U, and V components or Y, I, and Q components), in which the luminance (i.e. black and white) information is stored in the Y component, and the color information is stored in the remaining components. This form of transformation (or "decorrelation") provides some reduction in the overall number of bits for each frame (typically on the order of about half), but it adds additional computation at the decompressor or receiving end of a transmission, as the pixels in the decorrelated color space must be transformed back to their native RGB color space. Further, as resolutions increase (such as with high-definition video), the complexity and cost of decompression hardware increases, and thus becomes a significant issue for content distributors.

Also contributing to the overall cost and complexity of decompression is the "store and forward" nature of most video codecs, in which a video is compressed once, but decompressed numerous times. Examples of such systems are "video on demand" systems, in which digital videos are rented or purchased by end users for viewing. In these applications, almost unlimited computational power can be implemented on the compression side, as the cost of compression can be spread across many decompressions. As frame resolution increases, however, the decompression hardware, which may be a set-top box, general purpose computer, or even a handheld device, is often incapable of decompressing the content at speeds or reliabilities satisfactory to most end users.

To combat these issues, conventional video compressors, such as MPEG-2 and H.264, utilize motion vectors that describe how to rearrange data elements of a previous frame to generate a new frame representation. This is generally accomplished by dividing each frame into squares or "blocks" of a fixed size and determining the motion vectors that define how the blocks of the previously-generated frame should be moved to best represent the current frame. Accordingly, the motion vectors represent the motion of blocks from one frame to the next. This method reduces the overall computational complexity of a system because the representation for each new frame is generated based on the representation of the previous frame, and thus a new data representation does not have to be generated from scratch for each new frame. Also, the utilization of motion vectors is highly "asymmetrical"—the compressor must decide amongst many alternatives (vectors), whereas the decompressor only has to apply the chosen vector. Thus, complexity on the decompression end is reduced.

Use of motion vectors generally functions best for video sequence data in which the content of a scene is relatively stable. Motion vectors are typically expressed in terms of the difference between the chosen motion vector and a prediction caused by the surrounding vectors. This difference is encoded using a predefined table of codes. Because the predictions are based on relatively minor movements of blocks between frames (i.e. blocks are chosen in isolation based on a locally-optimal choice), this conventional coding scheme does not work well for video sequences with high levels of content movement, as the system is unable to determine a good match in the subsequent, local block area for a given block. In addition, by choosing motion vectors based on a locally-optimal choice, scenes with uniform motion (such as a steady camera pan) will often distort the subsequent frames, as false correlation will occur between blocks.

Regardless of problems with motion vectors, once a motion-approximated screen has been defined, most conventional codecs encode the determined pixel differences via a discrete cosine transform (DCT). Generally, a DCT expresses a sequence of finitely many data points in terms of a sum of cosine functions oscillating at different frequencies. The DCT for most codecs is "symmetric" in the sense that the number of computations necessary to carry out the transform is basically equivalent to the number of computations necessary to compute the inverse. Thus, as screen resolutions increase (for high-definition and beyond), the computational burden of the DCT becomes significant.

However, many content providers and distributors provide both high-resolution and low-resolution content, and thus the associated codecs need to be equipped to handle both types of video. Conventional codecs, however, are ill-equipped to handle such content variations, as traditional compressors are tied to particular resolutions because the underlying transform is designed to transform blocks of a fixed size (usually 8×8 pixels—although other sizes are possible). The dependence on blocks of a fixed size limits the codec such that video compressed at a particular resolution cannot be decompressed at a different resolution with post-processing. Additionally, fixed block size compressors have difficulty compressing and encoding detail at a smaller scale. These compressors are also unable to take full advantage of potential efficiencies associated with large, slow-varying images in video frames.

Some systems have been developed in an attempt to overcome some of the above-referenced problems with conventional codecs. An example of such a system is described in detail in Hurd et al., U.S. Pat. No. 5,982,441, issued Nov. 9, 1999, and entitled "System and Method for Representing a Video Sequence," which is incorporated herein by reference as if set forth herein in its entirety. However, these systems may not perform well for high-resolution videos, and also do not take advantage of efficiencies associated with current, improved computational processors.

Therefore, there is a continuing need for a codec that improves both the quality of the produced output and the speed of playback of a compressed/decompressed digital video. The needed codec preferably employs a compressor capable of: utilizing blocks of any size, varying motion vectors to prevent artifacts (ie., visual distortions) in regions of uniform motion, and adapting motion vectors to the given frame. There is a also a need for a compressor that makes decisions based on efficiency, allows description of a video bitstream in a resolution-independent fashion, and is capable of supporting a low-complexity decompressor. There is an additional need for a codec that employs a decompressor that is capable of operating solely in the RGB color space.

BRIEF SUMMARY OF THE PRESENT INVENTION

The present systems and methods relate generally to an improved codec for compressing digital video data in a resolution-independent format and that enables decompressing of the same in an efficient and effective manner. The codec and system described herein improves both the quality of the produced output and the speed of playback of a compressed/decompressed digital video. The codec and system described herein uses a compressor capable of analyzing and compressing frames of a video with blocks of variable size, varies motion vectors to prevent or minimize the creation of artifacts (ie., visual distortions) in regions of uniform motion when the video is later decompressed and viewed, and is able to select and adapt motion vectors on a frame by frame basis. The codec and system described herein uses a compressor that makes decisions based on efficiency, balances between distortion and rate, allows description of a video bitstream in a resolution-independent fashion, and is capable of supporting a low-complexity decompressor. The codec and system described herein also makes use of and is compatible with a decompressor that is capable of operating solely in the RGB color space.

In one embodiment, a method for compressing video data, comprises the steps of selecting a current video frame of the video data, wherein the video frame is comprised of a plurality of pixels, dividing the current video frame into a plurality of blocks, wherein each block is comprised of M×N of the plurality of pixels, in a first iteration, approximating the blocks of the current frame based on motion vectors associated with corresponding blocks from the previous frame of the video data, in a second iteration, further refining the blocks of the current frame by determining optimal motion vectors for the blocks of the current frame based on the motion vectors provided by the corresponding blocks from the previous frame, by the surrounding blocks in the current frame, and from successively smaller blocks from the current frame, and wherein the optimal motion vectors for the blocks of the current frame are optimized to balance distortion and rate and wherein the optimal motion vectors are represented by codewords generated from Huffman tables.

In features of this embodiment, the block sizes can be 8×8, 4×4, or 2×2. In other features, the blocks of the current frame having optimal motion vectors are of differing sizes even within a single frame. In another feature, the blocks of the current frame having optimal motion vectors are all of same size within the single frame.

In another feature, codewords for a frame are included in a codebook. In an additional feature, multiple codebooks are used to code the compression method of the current frame and each codebook corresponds with different sized blocks in the current frame.

In another feature, the blocks of the current frame are optimized to balance distortion and rate according to the formula of $D_1+(\lambda)R_1<D_2+(\lambda)R_2$ wherein $\lambda$ is a non-negative value that is modifiable based on desired tolerance values. Preferably, an initial value for $\lambda$ is selected for the current frame based on the $\lambda$ used for the prior frame. In another feature, simulated annealing is used to prevent the selection of optimal motion vectors that are optimal locally but not globally for the current frame.

In another feature, the pixels are converted from RBG to YUV values. Such conversion is selected to occur at optimal points in the iteration process.

In another feature, the optimal motion vectors for the blocks of the current frame are optimized by ranking candidate motion vectors from neighboring blocks higher than other blocks. Preferably, ranking of candidate motion vectors from neighboring blocks higher than other blocks is determined by the formula $C=D+(\lambda)R+(\mu)V$ wherein C equals cost, D equals distortion, R equals rate, $\lambda$ is a non-negative value that is modifiable based on desired tolerance values, V is an amount by which a velocity vector differs from the mean of the velocity vectors above, below, to the left, and to the right of the motion vector of the respective block under consideration, and $\mu$ is an arbitrary constant. Additionally, it is preferable but not mandatory for $\mu$ to be set to 1. Additionally, calculation of $C=D+(\lambda)R+(\mu)V$ allows for the selection of a motion vector for a respective block to minimize swimming effect when the respective block is decompressed.

Other features, methods, processes, apparatuses, systems, and improvements will be apparent to those skilled in thwart after reference to and consideration of the remainder of this document.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein:

FIG. 10 provides an exemplary Huffman table specifying the block address for 1-1 fractal codes.

DETAILED DESCRIPTION OF PREFERRED EMBODIMENTS

Figure 1:
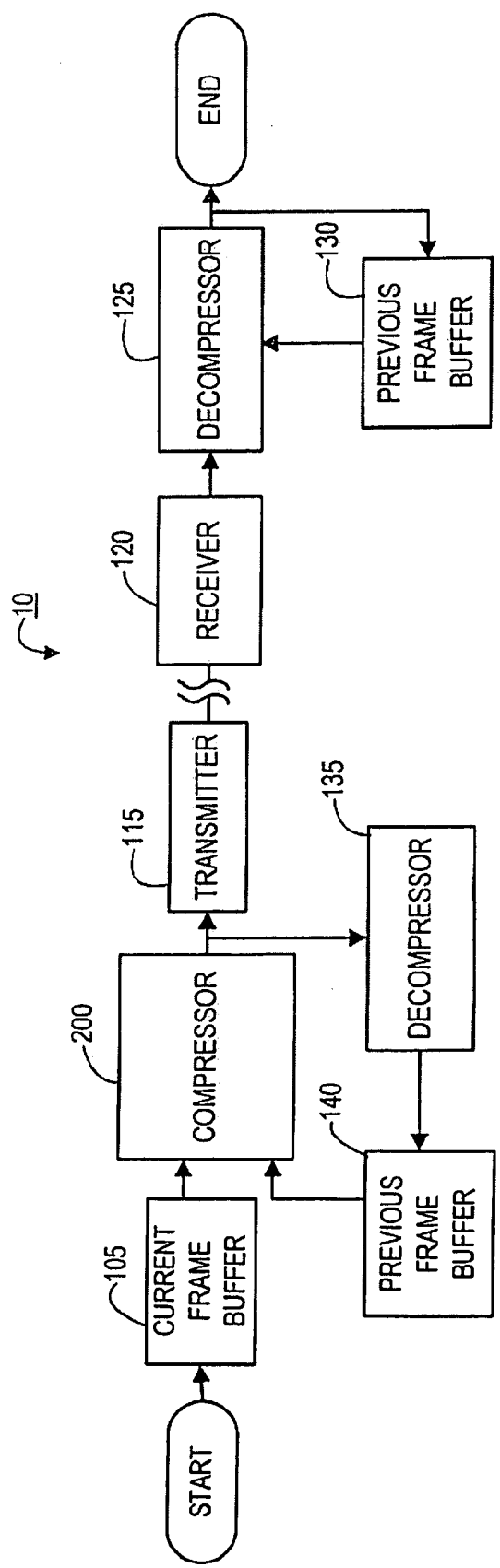
FIG. 1 is a high-level representation of the basic processes associated with one embodiment of the present system.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Overview

Aspects of the present invention generally relate to improved compression and decompression systems ("codecs") that improve the quality of compressed/decompressed video, that improve the overall speed of video playback, and that are designed to operate on a variety of image resolutions.

Referring to the figures, FIG. 1 is a high-level representation of the basic processes associated with one embodiment of the present codec 10. The codec 10 includes a compressor 200 which generates vectors or data representations (described in greater detail below), which are correlations between a current frame of video data (contained within current frame buffer 105) and a previous frame (contained in previous frame buffer 140). The contents of current frame buffer 105 are video frames supplied by a video sequence generator, such as a camera or the like. As will be understood, these frames may be retrieved from a stored video, or may be pulled in real time from a live video recording. The vectors generated by compressor 200 are output to transmitter 115, which transmits the data representation of the current frame to a receiver 120. As will be understood, the receiver 120 could be a satellite dish, cable receiver, or some other similar type of receiving component.

Once received, receiver 120 provides the vectors to a decompressor 125, which applies motion vectors, coefficients, and parameters contained in the vectors to the data elements stored in previous frame buffer 130 (described in greater detail below) to generate a current frame for display and to replace the contents of frame buffer 130. As will be understood, in one embodiment, the decompressed frames are displayed on an end-user's screen, such as a television or computer monitor.

Before transmission, the vectors output by compressor 200 are also provided to decompressor 135, which generates a representation of the current frame using the same process implemented by decompressor 125 (described below). The video frame representation generated by decompressor 135 is stored in previous frame buffer 140. The contents of previous frame buffer 140 are then used by compressor 200 to generate codewords which represent the content of current frame buffer 105 (discussed in greater detail below).

Compression

Figure 2:
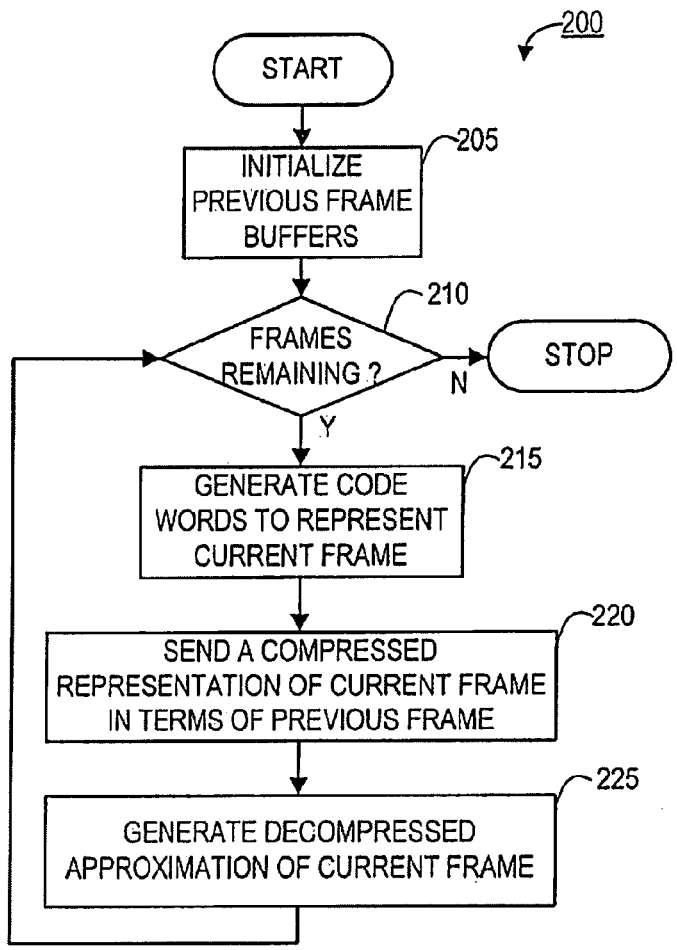
FIG. 2 is a high-level flowchart showing the processes associated with a compressor in an embodiment of the present system.

Embodiments of the present codec 10 generally utilize a compressor 200, the high-level components or processes of which are shown in FIG. 2. The process shown in FIG. 2 begins by compressor 200 initializing the content of the previous frame buffers 130, 140 (step 205). Generally, this may be done by either of two methods. In a first implementation, the very first frame of a video or video sequence is compressed using some self-referential compression method and this representation is transmitted to decompressor 125 via receiver 120, and provided to decompressor 135 as well. This action results in decompressor 135 decompressing the representation and writing the decompressed approximation of the first frame of video data into previous frame buffer 140. Likewise, decompressor 125 generates a frame of data corresponding to the first frame of the video sequence, and this data is likewise used to initialize the previous frame buffer 130.

A second method of initialization involves compressor 200 initializing previous frame buffer 140 to all of the data elements of mid-level gray color and transmitting a start of sequence signal to decompressor 125. In response, decompressor 125 initializes the data elements of frame buffer 130 to the same gray scale values as buffer 140. This second method of initialization is preferred so that decompressors 125, 135 need not implement a completely self-referential compression scheme. As will be described in greater detail below, convergence on an accurate approximation of the current frame of video data is quickly achieved using the initialization methods of step 205.

After frame buffers 130 and 140 have been initialized, compressor 200 checks current frame buffer 105 to determine whether a current frame is ready for processing (step 210). If no frames are available for processing, the video sequence is finished and the compressor 200 terminates its process. If, alternatively, a video frame does remain for processing, compressor 200 uses the contents of previous frame buffer 140 to generate a data representation of the frame data in current frame buffer 105 (step 215). This representation is provided to transmitter 115 (step 220) so that the representation may be transmitted to receiver 120 for use by decompressor 125 to generate the next video frame for display. Compressor 200 also provides the representation of the current frame of video data to decompressor 135 (step 225) so that decompressor 135 may generate a frame that corresponds to that generated by decompressor 125. The frame data generated by decompressor 135 is used to overwrite the contents of frame buffer 140. Compressor 200 then iterates by checking for another frame to compress (step 210), and the process continues until the given video sequence is finished.

Codec Basics

The basic algorithm underlying embodiments of the present codec 10 shares with several standard codecs, such as MPEG-1 through MPEG-4, the property that video frames are coded either as "predictive frames" (P-frames) or "intraframes" (I-frames or self-referential frames). P-frames code information based on a motion-compensated version of the immediately previous frame. Alternatively, I-frames are described without reference to any other frames. That is, the data content of the I-frame is compressed to represent the given frame. Unlike its predecessors, however, there is no analog in embodiments of this codec of the "bidirectional frames" (or B-frames) commonly found in MPEG codecs.

As will be discussed in greater detail below, embodiments of the present codec 10 describe each frame in a given video sequence by a combination of "motion vectors." Generally, these motion vectors define data representations of the video data in a current frame in terms of video data in a previous frame. In order to generate these vectors, each video frame is divided into a plurality of squares or "blocks" of a predetermined size (for example, 8×8 pixels). The blocks are translated from an immediately previous frame and mapped to a current frame (i.e. the frame being compressed). After a frame has been approximated by content of the previous frame by means of motion vectors, a second pass is made to further refine this approximation. In this second pass, blocks can be taken either from the previous frame or from the reconstructed frame. In various embodiments of the present codec 10, these blocks are taken at the same scale, or scaled 2-1, or also include an additive constant. Additionally, unlike conventional MPEG systems, detail is gained by describing successively smaller blocks (as shown and described in conjunction with FIG. 3). Further, based on the block sizing and motion vector generation processes of the present codec 10, there are no higher order terms as there are in a DCT-based compression scheme.

Figure 3:
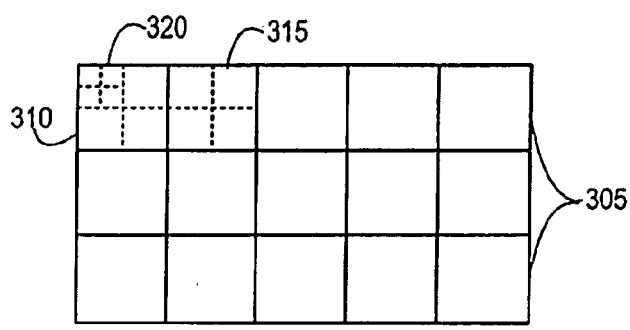
FIG. 3 shows a representation of a frame or frame buffer that has been divided into a plurality of blocks.

Referring to FIG. 3, a representation of a frame or frame buffer that has been divided into a plurality of blocks is shown. As shown, the frame has been divided into fifteen blocks 305 of predetermined size. As will be understood, however, the number and size of blocks shown in FIG. 3 is provided for illustration purposes only and does not relate to a specific implementation of the present system. While a corresponding block for each of the blocks 305 shown in FIG. 3 may be found in the previous frame buffer 140, the smaller children blocks into which specific blocks 310 and 315 are further divided may correspond more closely to blocks of the same size in frame buffer 140. The processing of the four child blocks in block 310 may result in the determination that one or more of these blocks are better represented by other blocks within frame buffer 140. The remaining blocks are determined to provide no better representation than parent block 310. The blocks selected as providing a better representation may then be further divided and evaluated. For example, one of the quadrant blocks 310 in FIG. 3 is shown as subdivided into blocks 320. In one embodiment, the present codec 10 operates on each of the blocks in a recursive manner, subdividing blocks that more accurately correspond to blocks in buffer 140 until the subdivided child blocks reach a predetermined minimum size. This type of processing may be performed in a recursive manner to generate a tree structure for each of the largest blocks shown in FIG. 3 (described in greater detail below).

Rate Control

One aspect of compressor 200 associated with embodiments of the present codec 10 is the use of a Lagrangian multiplier, lambda ($\lambda$). In one embodiment, a non-negative number $\lambda$ is selected as the conversion factor between distortion (D) and rate (R). Generally, distortion represents the difference between the original pixel value and the pixel value that is reconstructed from the compressed representation. There are several canonical choices. The simplest is the sum of the absolute value of the differences in each color. This is used because it is fast. Visually preferable is to use the sum of the square of the differences. Preferably, the present codec uses a slightly more sophisticated method that converts the RGB pixel value to YUV space and weights the squared difference in Y higher than U and V. This is done solely at the compressor side. The decompressor never has to worry about any colorspace but RGB (which improves the speed of the present codec). Rate represents the number of bits per frame. In any given instance, it is assumed that the compressor 200 is capable of selecting amongst several different ways to represent the original frame data. Each of these methods yields a distortion $D_i$, and is associated with a rate cost in bits $R_i$. If for a given technique, $D_1 < D_2$ and $R_1 < R_2$, the choice to use the given technique is unambiguous, as it is both accurate and economical. If, however, $D_1 < D_2$ and $R_1 > R_2$, then the constant $\lambda$ is used. Accordingly, in these circumstances, the given technique will be chosen if and only if:

$$D_1 + (\lambda)R_1 < D_2 + (\lambda)R_2.$$

As is apparent, in a case in which $\lambda$ is chosen to be zero, the method that yields the smaller distortion is chosen irrespective of rate.

Generally, the rate for a given embodiment of the present codec 10 is controlled by adjusting $\lambda$. There is an assumed inverse correlation between $\lambda$, which is a non-negative constant, and the rate. In one embodiment, an average number of bits per frame R is determined based the overall desired frame rate, and a tolerance is defined in an attempt to set each frame's rate between the tolerance values (for example, 0.8R and 1.2R, if a 20% tolerance is used). As will be understood, while a plus or minus 20% tolerance is given as an example, virtually any other tolerance may be utilized based on the desired output. In one embodiment, a factor of three is used for intraframes. Since an intraframe has no previous frame to build upon, it has to be described "from scratch;" thus, necessitating more bits. They are inserted to allow random access but there is a trade-off. More intraframes improve the ability to start at any point in the stream but reduce compression efficiency. Thus, for a 20% tolerance, the intraframes are targeted to fall between 2.4R and 3.6R. Again, as will be understood by those skilled in the art, these factors and tolerances are provided for exemplary purposes only.

Figure 4:
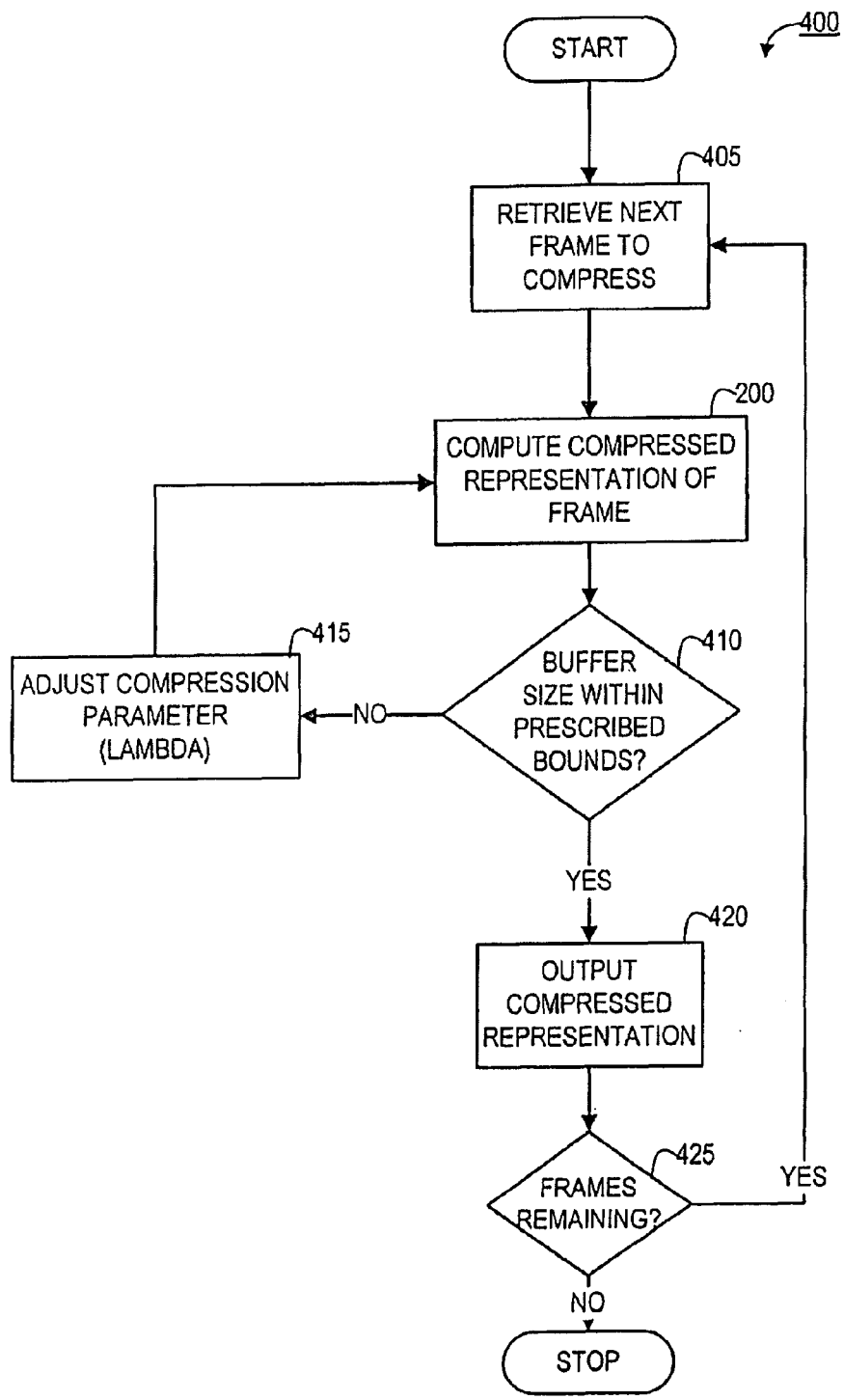
FIG. 4 shows a flowchart describing the steps involved in adjusting the compression parameter lambda for each frame in a video sequence to compress each frame within the desired rate according to one embodiment of the present system.

FIG. 4 shows a flowchart 400 describing the steps involved in adjusting the compression parameter $\lambda$ for each frame in a video sequence to compress each frame within the desired rate according to one embodiment of the present codec 10. As shown, at step 405, the codec 10 retrieves the next frame to compress. As will be understood, the "next" frame may, in some cases, be the first frame in a video sequence. Once the frame has been retrieved, the frame is compressed according to an embodiment of the compressor (process 200). At step 410, the system 10 checks to determine whether the frame buffer size (i.e. rate) is within prescribed bounds. If the frame buffer is not within prescribed bounds, then the compression parameter $\lambda$ is adjusted according to a predefined algorithm (step 415) (described hereinafter), and the compressed representation of the frame is re-computed (process 200). If, alternatively, the buffer size is within predefined bounds, then the compressed representation of the frame is output (step 420), and the system iterates for any remaining frames (step 425).

One embodiment of the predefined algorithm associated with steps 410 and 415 in FIG. 4 begins with an $R_{min}$ and $R_{max}$ as described previously (for example, 0.8R and 1.2R for P-frames). In one embodiment, the ideal size R, which starts as the mean of the top and bottom bounds, is set as the goal or desired R. Next, the function:

$$\text{rate}(\lambda) = |\text{rate} - R|$$

is used to determine how far the given frame is from the desired rate R, where "rate" is the actual rate of a given frame, and R is the desired rate. In one embodiment, a root-finding algorithm is utilized, such as bisection or Brent's method (which essentially interpolates a parabola from triples of points), to determine the next point (ie., the next $\lambda$) in the iteration. If, at any time during the iterations, the achieved rate falls between $R_{min}$ and $R_{max}$, the iterations are halted. Further, in one embodiment, if the number of iterations exceeds a predefined limit or cap, the iterations are also halted (not shown in FIG. 4). As will be understood based on the above equations, $\lambda=0$ represents the highest quality the present codec 10 can achieve given its constraints. Accordingly, if $R<R_{min}$ and $\lambda=0$, then the iterations are halted as well.

In order to "seed" each iteration and determine an initial $\lambda$ to use for each, embodiments of the present codec 10 keep track of two running values of $\lambda$—one for I-frames and one for P-frames. Thus, each new frame's iterations are started with the value of $\lambda$ used for the previous frame. As will be understood by one of ordinary skill in the art, for the first frame in a sequence, a starting or initial value of $\lambda$ can simply be chosen or defined.

Entropy Coding

Figure 5:
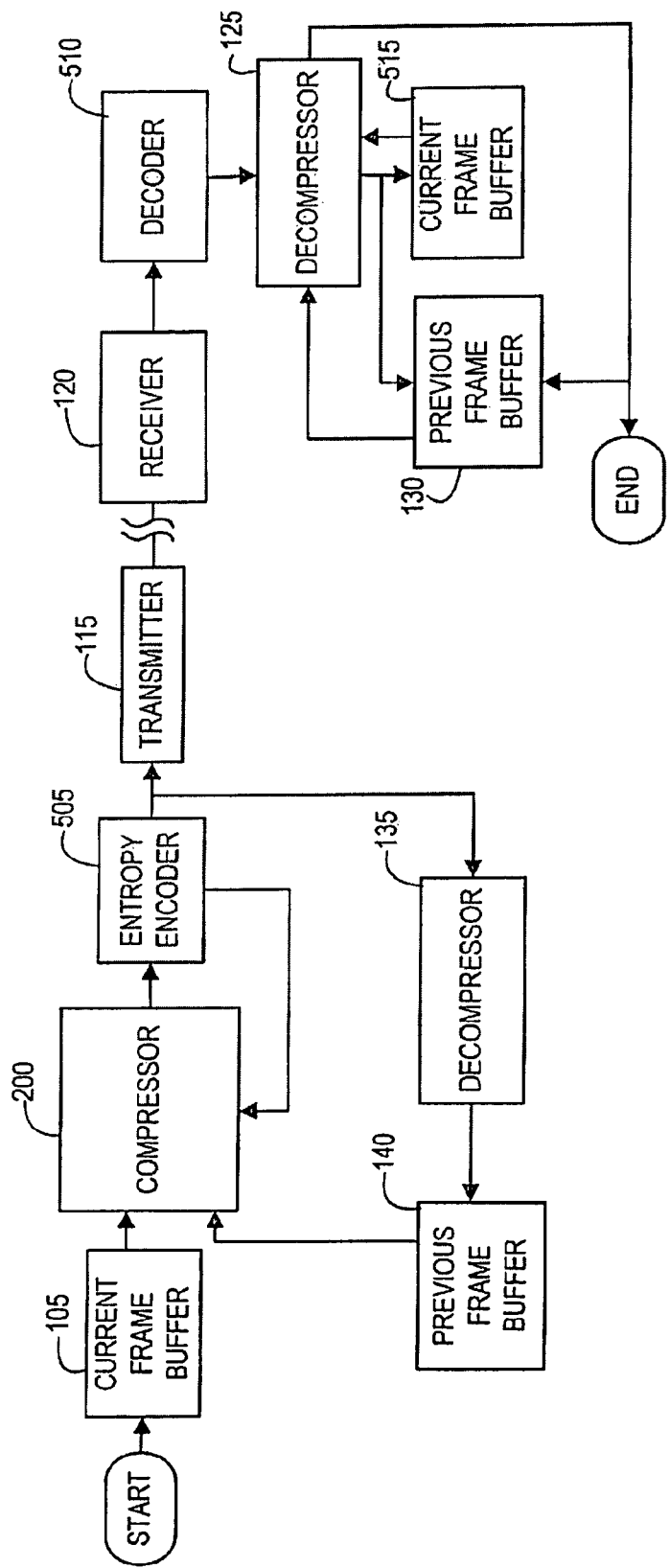
FIG. 5 illustrates an embodiment of the present system incorporating an entropy encoder.

Referring now to FIG. 5, an embodiment of the present codec 10 incorporating an entropy encoder is shown. The compressor 200 shown in FIG. 5 generates vectors which represent the video data of the current frame buffer 105 in terms of the video data contained in previous frame buffer 140, as explained previously. In the compressor 200, the selection of the vectors to represent a block includes evaluation of the size of the codewords which represent the vectors. These codewords may be generated based on Huffman tables, or some other similar mechanism (as described below). The bit size of the codewords for representing the vectors are generated via an entropy coder 505. Entropy encoder 505 provides the encoded vectors to transmitter 115 and decompressor 135. Decompressor 135 unpacks the encoded vectors and performs the decompressor process to generate the previous frame data for buffer 140. At the receiver site, a decoder 510 decodes the codewords received by receiver 120 and provides the decoded vectors to decompressor 125, which then generates a current frame 515 using the previous frame stored in buffer 130. As will be understood, the process shown in FIG. 5 reiterates until all frames for a given sequence have been compressed, encoded, transmitted, decoded, and decompressed.

Some embodiments of the present codec 10 utilize an adaptive arithmetic encoder for encoder 505, such as the Q-coder, QM coder, or MQ coder, which are described in detail in W. B. Pennebaker et al., *An Overview of the Basic Principles of the Q-Coder Adaptive Binary Arithmetic Coder*, IBM Journal of Research and Development, v. 32 n. 6, p. 717-26, November 1988: *Information Technology—Coded Representation of Picture and Audio Information—Progressive Bi-Level Image Compression*, ITU-T Rec. T.82|ISO/IEC 11544:1993, JBIG standard, 1993; and D. S. Taubman and M. W. Marcellin, *JPEG 2000 Image Compression Fundamentals, Standards and Practice*, Kluwer Academic Publishers, Boston, 2002, respectively, all of which are incorporated herein by reference as if set forth herein in their entirety. In these embodiments, the exact rate is not completely determined, but is estimated based on the state of the coder. Preferably, however, embodiments of the codec 10 use Huffman tables to generate codes (described in greater detail below). Huffman tables involve computable numbers of bits per codeword. Huffman coding also generally realizes the fastest decompression speeds when compared with other encoding mechanisms. Huffman codes and the methods for generating the same are known to those skilled in the art and are described in detail below, and in Weisstein, Eric W., *Huffman Coding*, from *MathWorld*—A Wolfram Web Resource, available at http://mathworld.wolfram.com/HuffmanCoding.html, which is incorporated herein by reference as if set forth herein in its entirety.

Figure 6:
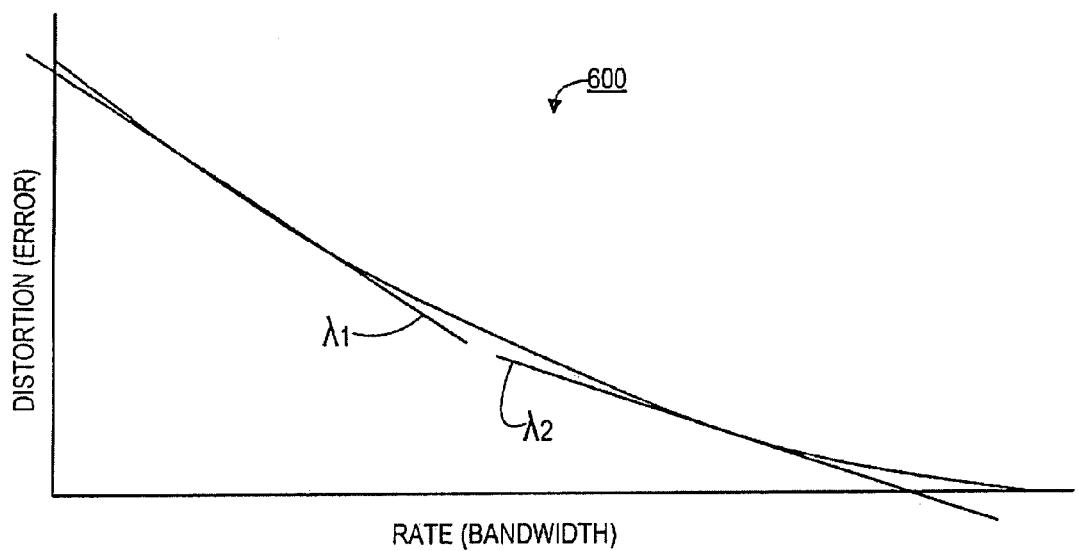
FIG. 6 illustrates a typical rate-distortion curve.

According to one embodiment, a rate-distortion curve 600, as shown in FIG. 6, is used for evaluating codeword selection. As indicated in FIG. 6, there is an inverse relationship between the number of bits used to represent frame data and the error generated in the approximate representation of the current frame. Specifically, as fewer bits are used to represent the current frame, the error in the representation goes up, whereas the error goes down when more bits are used. The family of lines which are tangent to a point along the curve shown in FIG. 6 identify optimal points of operation on the curve. The points which lie below the tangent line are considered to be acceptable, while points lying above the line are considered to be unacceptable. That is, if the distortion value or the rate value take the point to a location that lies above the tangent line, then the distortion becomes too great or the resulting bit stream too large to efficiently represent the vector. Preferably, a tangent line at the point where the distortion and bit rate are equal is selected for use in evaluating codeword selection. Alternatively, a point for a particular bit rate may be selected to continue the process.

Figure 7:
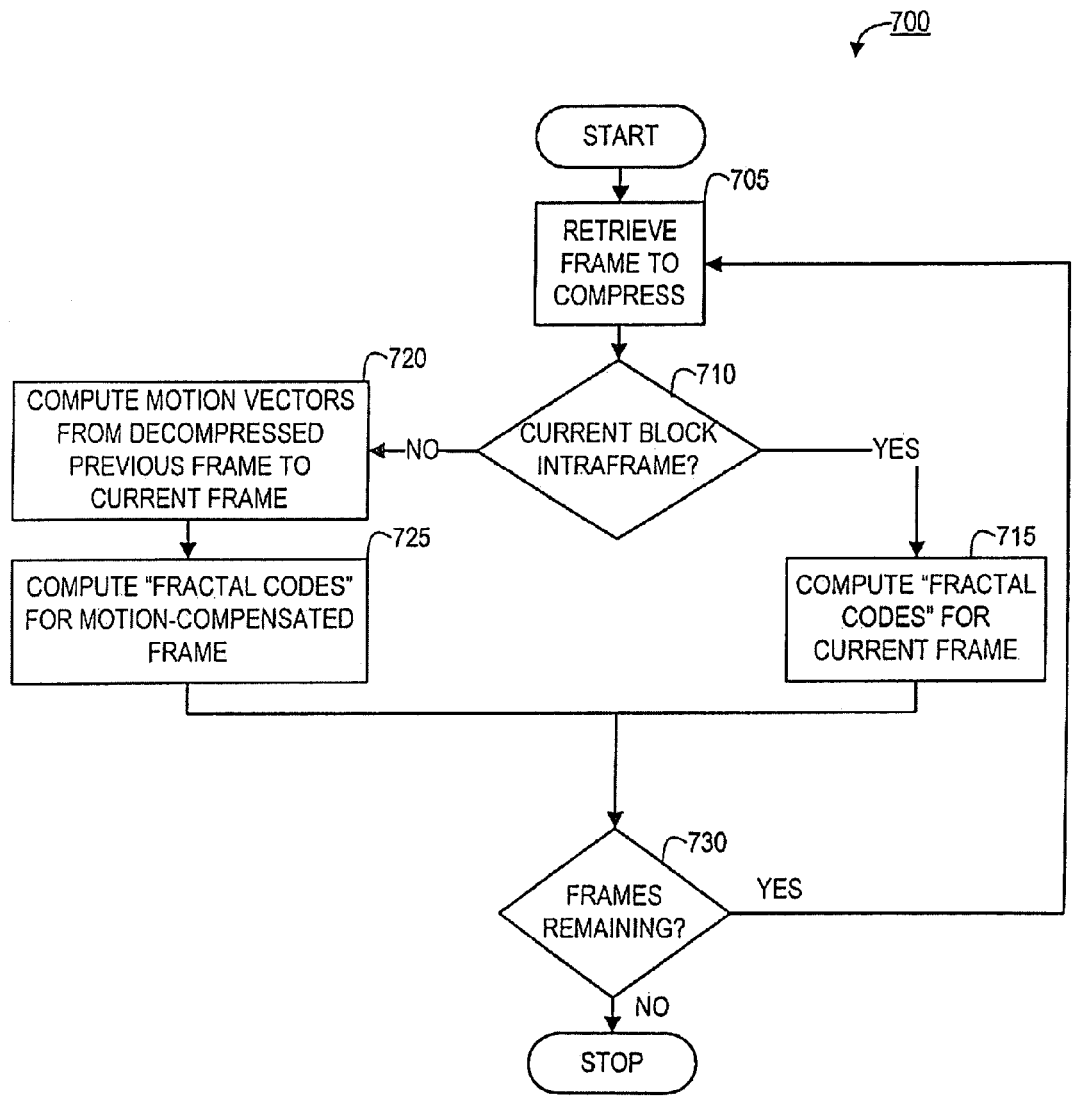
FIG. 7 shows a process for applying codes to a single frame according to an embodiment of the present system.

Referring now to FIG. 7, a process 700 is shown for applying codes to a single frame according to an embodiment of the present codec 10. At step 705, the system retrieves a frame that is to be compressed. The codec 10 then determines whether the retrieved frame is an I-frame or a P-frame (step 710). If the frame is in fact an I-frame, then the codec 10 computes the "fractal codes" for the current frame (step 715). Generally, a "fractal code" is a transformation that describes a frame in terms of itself. Fractal codes and their specifics will be discussed in greater detail below. If the retrieved frame is not an I-frame, but is instead a P-frame, then the codec 10 computes the motion vectors from the decompressed previous frame to the retrieved frame (step 720) (discussed in greater detail below). Next, the fractal codes for the motion-compensated frame are calculated (step 725). At step 730, the system 10 determines whether any frames in the given video sequence remain. If so, then the process 700 reiterates with the new frame. If not, then the process 700 terminates.

As described in more detail below and according to one embodiment, the "fractal codes" that form the second part of a compression process are represented by a series of fixed Huffman codes. Alternatively, the motion vector portion of the bitstream relies on a Huffman code that is fixed for the duration of a frame, but which is specified in the frame header accompanying each frame. As mentioned, further details relating to Huffman codes and motion vectors will become apparent below.

Motion Vectors

As mentioned above, embodiments of the present codec 10 utilize motion vectors to assist in representing P-frames. Every P-frame starts with an initial, configurable blocksize (most typically 8×8 pixels, although it may vary between 16×16 and 4×4, or other sizes, depending on the resolution of the frame). In one embodiment, the same size as the configurable blocksize is used to describe motion blocks as the top-level or largest size in the fractal codes; however, this is not necessary in all embodiments, and the two sizes could be independent.

In one embodiment, each motion block is compared to all possible blocks in a set of candidates. In the simplest case, this means comparing a given block with blocks in a rectangle consisting of r−1 blocks to the left, right, top, and bottom. Stated another way, the system can, for example, analyze blocks in a 5×5 square whose upper left corner have (x,y) coordinates within 2 in each direction (for "radius=2"). Often, the search area encompasses a rectangle that is wider than it is high to reflect the preponderance of left-right motions in video content as opposed to up and down motions. Other embodiments of the present codec 10 employ a speed-up technique that completes a coarse search on a downsampled screen to determine a subset of candidate gross motion vectors, and then instead of coding via a single rectangle, multiple rectangles are added that are centered around these preferred motions. Accordingly, the computational effort is roughly based on the number of candidate vectors, and does not rely on the confinement of these vectors to a rectangle. In this way, the arbitrary set of "preferred" motion vectors are associated with a non-rectangular area.

The present systems and methods recognize a trade-off between rate and distortion of candidate motion vectors. One extreme is picking a block with the minimum distortion at all opportunities. The other extreme is picking whatever motion is least expensive to send regardless of its error.

Figure 8:
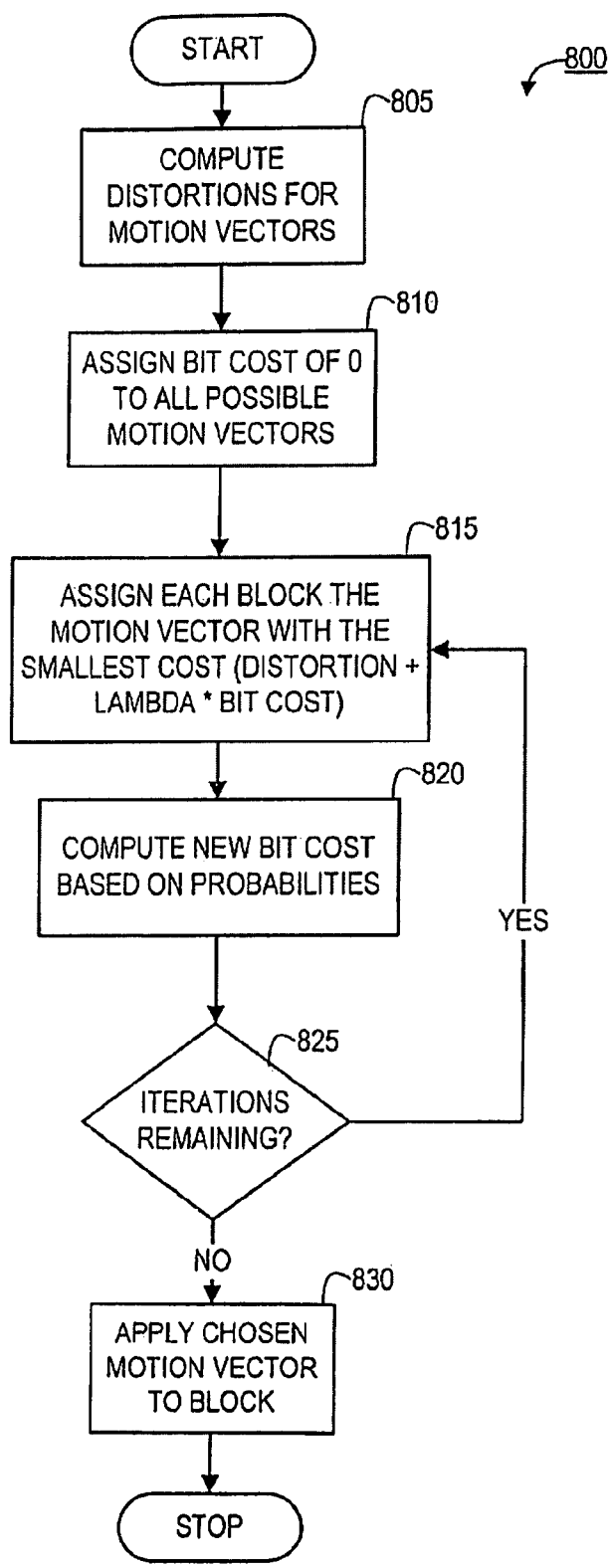
FIG. 8 depicts the iterative motion scheme for generating a motion vector for a given block according to an embodiment of the present system.

Generally, the process of generating and assigning motion vectors is accomplished by a series of iterations. FIG. 8 depicts the iterative motion scheme 800 for generating a motion vector for a given block according to an embodiment of the present codec 10. At step 805, the distortions are computed for the given motion vectors. Next, at step 810, an initial bit cost of zero is assigned to all possible motion vectors. According to an initial iteration (not represented in FIG. 8), it is assumed that all possible motion vectors "cost" the same number of bits to send, and thus the system 10 simply generates a list comprising the lowest distortion vector for each block. Having generated the list of lowest distortion vectors, a histogram of frequencies can be generated, and therefore, for each motion vector, a probability of using a certain motion vector for a block in that particular frame. For example, if all blocks in a particular frame were matched to blocks 5 pixels to the left, the vector (5,0) would have probability 1 (obviously, this example would not be work for an entire frame since edge blocks could not be assigned a value off the edge of the frame). Using the usual technique from information theory, each possible motion vector is assigned a rate in bits based on the negative base two logarithm of its probability.

In a second iteration at step 815, instead of minimizing the distortion, the system 10 attempts to minimize the cost, C, which is represented by:

$$C=D+(\lambda)R.$$

Generally, this second iteration will fail to uncover a previously unused motion vector, but instead will often clump the motion vectors, as a trade-off is made to slightly increase the distortion by using a motion vector with higher probability. At the end of this second iteration, a list of frequencies (hence probabilities) is again generated, and again a rate is calculated for each vector (step 820). Generally, the motion vectors with relatively high probabilities in the previous iteration will have increased their share of the blocks, while the less popular vectors will have lost some blocks.

At step 825, the codec 10 determines whether there are iterations remaining. If so, steps 815 and 820 are repeated. If not, each chosen motion vector is applied to its respective block (step 830) and the process 800 is ended. In one embodiment, the iteration steps 815-825 are repeated until the movement of blocks is negligible. However, this iterative scheme is somewhat susceptible to local minima, and thus the process may converge on a suboptimal solution. Accordingly, to prevent this occurrence, some embodiments of the present system 10 employ a predetermined number of iterations, which could be as few as one or as many as desired.

According to one embodiment, once the iterations of process 800 have completed, a fixed number (preferably sixteen) of the most popular motion vectors are selected to form a "codebook". Unlike conventional codecs that use fixed or predefined sets of tables to describe a frame, embodiments of the present codec 10 utilize these codebooks to account for varying statistics. Each of these selected motion vectors is associated with a corresponding Huffman code. A probability is also computed that the best (i.e. most accurate) motion vector is not one of the selected vectors, and an "escape" Huffman code is assigned to account for all other vectors. A vector not among the selected vectors is sent as the escape code followed by the x and y coordinates in uncompressed fashion. As will be understood, the number of bits this transmission requires depends on the bounds of the initial search area.

In order to convey this custom codebook to the decompressor, a Huffman code is computed based on the new frequencies and based on the understanding that the lengths of the codewords representing each value (e.g., instead of sending a codebook consisting of "0", "10", "11", the integers 1, 2, 2 can be sent) must satisfy the Kraft Inequality by sorting the lengths and using an expression giving a fixed codebook for a set of lengths. The Kraft Inequality is described in detail in *Algorithms and Theory of Computation Handbook*, CRC Press LLC, 1999; *Kraft's inequality*, in Dictionary of Algorithms and Data Structures [available online]; and Paul E. Black, ed., *U.S. National Institute of Standards and Technology*, (December 2004) (accessed Oct. 6, 2007), available at http://www.nist.gov/dads/HTML/kraftsinqlty.html. The original Huffman code is discarded and a new one is created based solely on these lengths. Essentially, a codeword smallest in lexicographic order is assigned to each symbol, which maintains the prefix property of the code.

Simulated Annealing

As mentioned, simple iteration (described above in conjunction with FIG. 8) may lead to undesired "local maxima" or "local minima," and thus not achieve the best possible result. One way to combat this issue is via a technique known as "simulated annealing," which is described in detail in Carr, Roger, *Simulated Annealing, from MathWorld*—A Wolfram Web Resource, available at http://mathworld.wolfram.com/SimulatedAnnealing.html, which is incorporated herein by reference as if set forth herein in its entirety. Essentially, this process consists of adding "randomness" to the iterations, such that each step does not necessarily lead to the most profitable change, but, with some probability, may temporarily worsen the situation in order to allow the system to iterate out of locally optimal (but globally suboptimal) minima.

To add the desired "randomness" to the iterations, an analogy to statistical mechanics is drawn. In statistical mechanics, a particle may enter a higher energy state with probability given by:

$$P=\exp(-\Delta C/T),$$

where C represents the Lagrangian cost, P defines the probability, and T represents an artificial number, such as temperature, that determines the degree of randomness. This probability equation is somewhat analogous to the Boltzman energy distribution. The decision factor comprises analyzing a list of candidate vectors and making a determination whether to replace the current "best guess" with the one from the list. A deterministic minimum finder would simply take the new guess whenever it has lower cost than the best one encountered at that point in the iterations. By using a randomness function, however, the codec 10 occasionally utilizes a new vector that could potentially be less accurate depending on the value for T.

In one embodiment, in order to ensure that the system is not favoring certain candidate blocks towards the end of a search, the system randomizes the order in which candidates are compared. For each block, the order of the candidate vectors is shuffled via a conventional random shuffle based on linear congruence. In a further embodiment, the order in which blocks are considered is also randomized (discussed below).

According to one embodiment, the codec 10 employs seven iterations with temperature schedule (400,200,200,100,100,0,0). In this embodiment, the last two iterations have no random factor at all. As will be understood, however, other numbers of iterations and randomness factors are possible in other embodiments of the present codec 10.

In an alternate embodiment, other techniques are used for converging on a motion vector for a given block, such as the deterministic threshold technique, which is described in detail in Dueck, G. and Scheuer, T, *Threshold Accepting: A General Purpose Optimization Algorithm Appearing Superior to Simulated Annealing*, J. Comp. Phys. 90, p. 161-75 (1990), which is incorporated herein by reference as if set forth herein in its entirety. This technique eliminates the random variable and accepts a perturbation, assuming it is within a temperature-dependent threshold of the current (upwards, a downwards step is always taken). Stated another way, if the choice the system is considering is better than the one the system currently has, the system swaps what it has for what comes next. If the system continued always doing this, this would result in a method known as gradient descent. The crux of simulated annealing is that if the new alternative is worse than what the system already has, the system still can take the new value with some probability. The higher the temperature, the greater the chance the system will take a "worse" value. The theory is that this randomness allows the system to eventually reach an even better globally optimal solution.

Spatial Coherence

One artifact that sometimes occurs in embodiments of the present compression process arises when the video content includes a panning camera against a smooth surface, such as a painted wall. As will be understood, however, the described problem may arise when any smooth or uniform content is present. The problem arises because many motion vectors are virtually equally good in the sense of distortion. If the compression algorithm simply picks the best motion vector for each block independently, blocks may appear to "swim" around when viewed by an end user. This artifact is attributed to an imperfection of the utilized error metric. The system is not actually minimizing visual distortion directly, but rather an easily-computed substitute, such as mean squared error. To help combat this problem, some embodiments of the present codec 10 introduce another term into the cost equation when computing motion vectors. Instead of simply weighting a candidate motion vector as:

$$C=D+(\lambda)R,$$

an additional term is added which takes into account the neighboring blocks, producing the equation:

$$C=D+(\lambda)R+(\mu)V$$

in which mu ($\mu$) is an arbitrary constant (preferably set to 1, but other values are possible), and V is the amount by which a velocity vector differs from the mean of the vectors above, below and to the left and right of the motion vector of the block under consideration The factor $\mu$ penalizes large deviations from the motion vector chosen for the block on top, to the left, to the right and below the block under consideration. This will enable the system, if the possible choices are nearly a tie, to choose a uniform motion. For example, if one considers a camera panning across a painted wall, almost all possible motions are about equally good since most of the squares look the same and a standard algorithm that computes the best choice of block will end up picking motion vectors that vary considerably. The human eye, however, is very sensitive to motion—so picking different vectors will appear to the human eye as if the blocks are "swimming" along even though the effect is not noticed by the distortion measure. The distortion in velocity is measured in mean square deviation in velocity space.

According to embodiments of the present system 10, there are two formulas that are used to compute V. In one embodiment, the velocity vectors:

$$(x_{north}, y_{north}), (x_{east}, y_{east}), (x_{south}, y_{south}), (x_{west}, y_{west})$$

denote the motion vectors selected for the four neighboring blocks. Thus, the system 10 utilizes:

$$dx=4x-(x_{north}+x_{east}+x_{south}+x_{west})$$

and $$dy=4y-(y_{north}+y_{east}+y_{south}+y_{west})$$

to compute V, based on the equation:

$$V=dx^2+dy^2.$$

In another embodiment, an alternate formula used to calculate V is:

$$V=\min(dx^2+dy^2,64).$$

Generally, in order to have a good sampling of vectors around a block, vectors are not computed for blocks in scan-line (ie., left to right and top to bottom) order, but rather in a pseudorandom order. In the first pass or iteration, there are often no good approximations. As the iterations continue, however, the system mixes the vectors arrived at in the current iteration and the previous iteration. For this reason, in one embodiment, $\mu$ is set to zero in the first pass.

Fractal Codes

As mentioned previously, "fractal codes" are all transformations that describe a frame in terms of itself. Generally, they are applied successively to a frame and may be applied at multiple block sizes.

In one embodiment, the starting point for generation of the codes is either a fixed, "gray" frame (in the case of an I-frame), or the result of motion compensation applied to the preceding frame by an initial part of the compression algorithm. In one embodiment, a series of corrections are applied to the frame being approximated that consist of selecting a region from the current frame being analyzed, applying a transformation to the region, and then replacing it. Note that since the frame being analyzed is the current frame, each block potentially starts from a different set of possibilities. Accordingly, as the frame is successively approximated, the pixels become more accurate predictors of what motion will occur next.

Based on a specified lambda for a given frame (and block) being compressed, various candidate blocks are compared via one of three categories of processes:

1) 1-1 fractal codes—a square block of pixels is copied from one part of the frame to another, possibly with the addition of an additive constant.
2) 2-1 fractal codes—a square block of pixels is downsampled by a factor of two and then written back into the current location, possibly after adding a constant.
3) Recursive motion vectors—the current block is replaced by a block from the previous screen. The term "recursive" is used because this option generally exists only for blocks smaller than the largest block size.

In one embodiment, a fourth category is used, in which the current block is simply left unchanged. The compression algorithm weighs and compares, for each block, the different categories of processes based on the Lagrangian cost function (referenced above), and selects the most appropriate for the given block.

Figure 9:
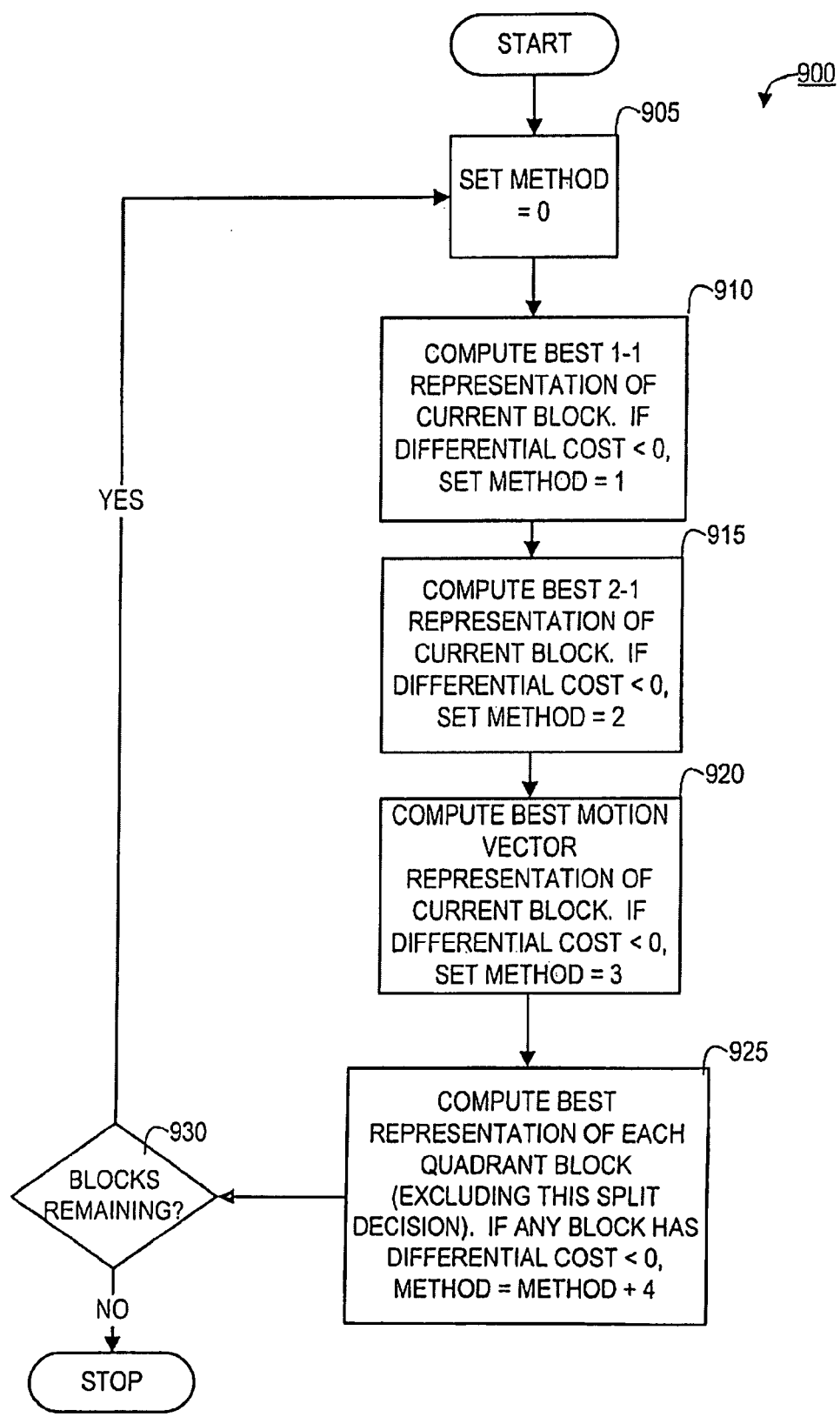
FIG. 9 shows one embodiment of the method for comparing candidate blocks in order to process the associated fractal codes.

FIG. 9 shows one embodiment of the method 900 for comparing candidate blocks in order to process the associated fractal codes. Using the method 900, the most appropriate category of fractal codes (as specified above) is selected. In the embodiment shown in FIG. 9, the category (or method) for the given block is initially set to 0 (step 905). At step 910, the codec 10 computes the best (i.e. most accurate) 1-1 representation of the current block. If the differential cost is less than 0, then the codec sets the method to category 1. At step 915, the codec 10 computes the best 2-1 representation of the current block. If the differential cost for this computation is less than 0, the method is set to category 2. At step 920, the codec 10 computes the best motion vector representation of the current block. If the differential cost for this computation is less than zero, then the method is set to category 3. At step 925, the codec 10 computes the best representation of each quadrant block. If any block has a differential cost less than zero, then the method is, set to method plus 4. Stated another way, the system starts the process of finding fractal codes from a motion-approximated frame. This motion-approximated frame has a fixed distortion from the original. Any further codes the system sends presumably improve the distortion (i.e., make it smaller) but they also add to the rate (making it larger). The net gain is measured by the distortion improvement (negative) plus lambda times the rate increase (positive). If the decrease in distortion exceeds the increase in rate, the system deems the change to be worthwhile. The codec 10 then determines whether there are any blocks remaining to be processed (step 930). If so, then steps 905-925 are repeated for the next block. If not, then process 900 is ended.

Generally, the 1-1 and 2-1 fractal codes are described in terms of:
1) address—a code that specifies the x and y offset of the block to be copied.
2) q-value—a code that specifies a constant added to the R, G and B values. This value is generally bounded between −128 and 127, but other bounds are possible.

The address provides the offset to the block on the same frame that is to be copied. In one embodiment, the possible offsets are pre-computed in a spiral pattern to 256 possibilities, starting with (0,0).

As mentioned previously, several of the codes used for embodiments of this codec 10 involve a generic technique of employing "escape codes." This technique simplifies coding by dividing the possible codes into a few common possibilities and assigning an "escape code" to specify everything else. Accordingly, this technique enables easier management of the look-up tables used in aspects of entropy coding.

FIG. 10 provides an exemplary Huffman table specifying the block address for 1-1 fractal codes. For 1-1 fractal codes, there are 256 possible values for the address and, therefore, 8 bits could be used to express all the possibilities. However, the actual table shown in FIG. 10 shows fewer than 8 bits for the 25 codewords presented. Looking at the list of codewords, it becomes apparent that no codeword is prefixed by the string "011." The codeword "011" forms the so-called "escape" code, and all indices from 25-255 inclusive can be coded as "011," followed by their code as an eight bit number. This escape code method renders 25 values with two possible codes, and the system leverages these unused codewords to add the possibility described below of an all-gray range block. One could add other possible starting points using the other ambiguous values if desired.

In some instances, blocks along any edge of a given frame may not have all their neighbors well-defined. In this instance, the system may be altered to modify the address codes so that the compressor 200 and decompressor 125, 135 both understand that the indices corresponding to blocks that are not in the frame are skipped over, and the index is assigned to the next legal block (ie., a block that lies entirely within the current frame).

In one embodiment, instead of trying every possible offset (which would be highly impractical), the q-values are computed based on the difference between the mean value of the pixels in the source and target blocks, which are computed for the three color components of a frame separately.

According to one embodiment, if the codec 10 utilizes processors and compression/decompression hardware with low computation speeds and complexity, then determining whether a pixel value exceeds 255 or falls below zero may be too expensive for the decompressor determine (based on a desired performance). Therefore, as an additional step, an adjustment is made so that the effect of adding q to any pixel in the given block does not exceed the maximum or minimum pixel values. It should be noted that a value of zero is always guaranteed to satisfy both constraints. Additionally, in one embodiment, the distortion caused by choosing a block is computed after this adjustment is made.

If, alternatively, the embodiment of the codec 10 utilizes computer chips and processors with relatively complex processing capabilities and fast processing speeds, the check to determine whether a pixel value exceeds 255 or falls below zero becomes less necessary, as "clamping" is implemented in the processing hardware. In other words, clamping mapping values that would result in a number <0 to 0 and values that would correspond to a number >255 to 255 (or whatever the maximum and minimum pixel values are for the current buffer). However, the clamping on the chip does not always completely correspond to what is available in the hardware, and thus various hybrid approaches may be used as determined by a codec operator.

According to a preferred embodiment of the present codec 10, the codec includes a possible source for a 1-1 code based on a constant block. Thus, instead of copying from the current frame, this offset starts from an always-available all-gray (128,128,128) block. More details of this process will be discussed below in the sections relating to encoding q-values and processing overlapped 1-1 blocks.

In one embodiment of the compressor 200, blocks are always attempted in order of increasing rate. Then, by keeping track of the best distortion and rate achieved at any given point, it is possible (and likely) that the compressor 200 will reach a kick-out point at which a reduction of the distortion to zero would fail to justify expenditure of the minimum number of bits.

In another embodiment, different candidate codes are attempted in the order specified. This consideration, however, suggests that some compressor speed-up may be achieved by intermixing the attempted blocks to get the best estimate for the best technique possible as early as possible in the process. Additionally, in some embodiments, it is possible to use a less conservative kick-out parameter, and thus stop iterating before it is logically impossible to achieve an improvement. In these circumstances, an improvement may be unlikely, but not impossible.

The 2-1 blocks are considered in a similar manner to the 1-1 blocks, except that they do not have overlapping properties (described below). Accordingly, the candidate block is formed by subsampling the candidate block by a factor of two in each dimension. For the 2-1 blocks there are again 256 address codes, and in this case the first block considered is the block lying directly on top of the block being considered. Thus, the block whose upper left corner is offset by half a block width from the original. For example, for a 4×4 block whose upper left corner is at coordinates (x,y), the system does not want to start with the 8×8 block whose upper left corner is also at coordinates (x,y) as this would make the original block the upper left quadrant of the bigger block. Instead, the system preferably would consider the 8×8 whose upper left corner is (x−2,y−2) (i.e., offset by half the original block width) because then the original block would lie in the center of the bigger block. After an optimal code is chosen for the given block, which includes the possibility that no top-level block is specified, the compressor 200 determines, for each quadrant, whether there is a code that could improve its distortion in a cost-effective manner. This process is continued recursively until a minimum blocksize is achieved. In one embodiment, the minimum blocksize is specified as a predetermined parameter to the compressor 200. A predetermined size of 2×2 pixels is preferable, but as will be appreciated, other sizes are possible.

For blocks smaller than the top-level block, one of the compression possibilities utilized amongst various embodiments for the smaller quadrants is to use a different motion vector from the one already applied, while using the same coding as the motion vectors specified for the entire frame. These motion vectors are generally referred to as "recursive" vectors.

Coding Q Bits

According to one embodiment of the present codec 10, the default precision for q-vectors is fifteen bits to accommodate display devices that encode an RGB triple in a single WORD (ie., a 16-bit machine word) by packing the bits consecutively. The codec 10 further reduces decompression time by providing a value that could be added in a single pass to a previously-packed RGB value to produce the new one. As will be understood, even though the base precision of the q-value is fifteen bits, compressor 200 can handle requests for as many as eight and as few as zero bits of precision (in the case of zero bits, the q-vectors are simply not sent) wherein the fifteen bits refers to all three colors, in which red, green, and blue are each allocated five of the fifteen bits (for sixteen bit modes (high color), green is allocated six; for twenty-four bit modes (true color), eight bits are allocated for each of the red, green, and blue colors). Because each block size affects four times the number of pixels of each of its quadrants, the default behavior is to lower the number of q-bits by two every time the block is subdivided. However, as will be appreciated, embodiments of the codec 10 allow for the specification of starting values over eight which are truncated to eight in practice. Thus, if a system operator desire to maintain high precision at lower levels, it is feasible to start with a large initial value.

In one embodiment, the Huffman codes used to represent the q-values treat the three color components (RGB) as one large vector, and specify one code to determine all three components simultaneously. According to one embodiment, the master Huffman table comprises fifteen-bit codes, with a look-up table of the most common alternatives, followed by an escape sequence. To send more than fifteen bits of precision (five per channel), a fifteen-bit code is specified, followed by the remaining bits in uncompressed form. Therefore, for example, a twenty-four-bit code would consist of a fifteen-bit value plus nine uncompressed bits. If the desired precision is less than fifteen bits, the value to be encoded is divided by the appropriate power of two before encoding as a fifteen bit value. For example, if two bits of precision are desired, the q values are divided by eight before coding.

Overlapped Blocks

When processing 1-1 fractal codes, the existence of a temporary buffer is not assumed. This non-assumption has a profound effect on copying when the region to be copied comes before the region being copied into. A one-dimensional example provides illustration. Assume, for example, that the block being copied into occupies pixels:

$$x_n, x_{n+1}, x_{n+2}, x_{n+3},$$

and further assume that the block being copied from occupies pixels:

$$x_{n-1}, x_n, x_{n+1}, x_{n+2}.$$

The value $x_{n-1}$ is assigned to location $x_n$, and then that value is copied into location $x_{n+1}$, and so on.

If the address assigned to a 1-1 block corresponds to a block with a higher vertical component, or a zero horizontal component, and a non-negative horizontal component (which corresponds to an upper left block corner later in scan order), then the pixel operations can be carried on without an intermediate buffer. In this case, the order in which pixels are moved from one location to another does not matter. Typically, pixels are moved two, four or eight at a time, which is usually faster in most modern processors. When the block overlaps, however, copying without an intermediate buffer affects the subsequent pixels, and thus order does matter. As used herein, "overlapping" refers to an instance when the block to be copied occurs earlier in scan order and thus overlaps the current block.

When overlapped blocks occur, copying without an intermediate buffer minimizes computational complexity on the decompressor side by avoiding an unnecessary copy. Additionally, this process also allows for a number of operations not otherwise easy to describe. For example, the process of copying and adding to a single pixel and then doing this pixel by pixel leads to gradients, which would be inefficient to compute if described independently. However, utilizing this process may, in some instances, make it difficult to employ speed-ups that can be afforded by moving two or four bytes in parallel using operations such as those provided by an MMX processor. This is avoided, however, by maintaining different routines to apply overlapped and non-overlapped blocks.

As an example, assume that the chosen block is one pixel to the left of the current block. In this case, the value in location $x_{i,j}$ will be the old value in $x_{i-1,j}$. In the second step, however, the value in $x_{i+1,j}$ will be the new value in $x_{i,j}$, or said differently, the old value in $x_{i-1,j}$. In this manner, the value in the left column of pixels will end up copied into every value in the block. If there is a non-zero q value, the new values in this row will be:

$$x_{i-1,j} q, x_{i-1,j} + 2q, x_{i-1,j} + 3q \ldots.$$

where the addition is or vectors.

Distortion Metric

As mentioned previously, most image standards, such as JPEG, MPEG-1, MPEG-2, MPEG-4, H.261, H.263, H.264, and the like, share the property that pixels are translated from their original RGB values into a perceptual luminance/chrominance space (YUV or similar). Also, it is common to reduce the spatial precision of the U and V fields by either a factor of two or four by subsampling in either the horizontal or horizontal and vertical directions. The rationale for such a conversion is that distortion in the luminance component (i.e. what would be displayed in a black and white television display) is more visually apparent than errors made in the chrominance (U and V) components.

The color transformation from RGB to YUV (or similar), when accomplished on a machine that displays RGB, such as most video cards, requires the decompressor 125 to make the conversion prior to display. This conversion causes additional, unwanted overhead (except in a closed system in which dedicated hardware may be used). To combat this issue, compressors 200 of the present codec 10 compute distortion when comparing blocks by transforming the pixels to YUV space, and then discounting the U and V portions of the distortion by a factor of four. As will be appreciated, while a factor of four is preferred, other factors are possible in various embodiments. Additionally, while various embodiments of the present codec 10 implement a number of metrics, the preferred metric is mean squared error. Thus, based on the preferred metric, the error is computed as:

$$(Y_2-Y_1)^2+(U_1-U_2)^2/4+(V_1-V_2)^2/4.$$

Note that this transformation only makes sense because the operations that are used—moving pixels or replacing a pixel by another pixel plus an additive constant—are all linear in the color space. Therefore, any operation that is performed according to this embodiment includes a direct analog in the other color space. In fact, when transformations according to this embodiment are implemented, the only time the color space needs to be considered is when computing the q offsets.

In one embodiment, some of the (R,G,B)→(Y,U,V) computations can be performed once and then amortized over several calculations. For example, in the motion phase of the video compression algorithm (as opposed to the fractal code stage), the two frames to be compared can be converted at the same time before any calculations take place. Similarly, during a fractal code operation, one given block can be converted once before being compared to several candidate blocks.

Quad-Trees

Generally, much of the compression of content detail in videos comes from the compressor's 200 ability to compress blocks of varying size. Specifically, embodiments of the codec 10 have the ability to compress a top-level blocksize of size N and smaller blocks of size N/2, N/4 etc., down to a specified minimum arranged in a quadtree. As used herein, a "quadtree" refers to the division of a largest block into four quadrants each of which in turn may have separate descriptions for their quadrants recursively in a depth-first fashion. In one embodiment, the maximum block size is assumed to be a power of two. However, as will be appreciated, the maximum block size could be any multiple of a power of two, so long as the maximum and minimum sizes differ by a power of two. Amongst various embodiments, blocksizes are specified in a global header for an entire video sequence, or on a per-frame basis, or some other according to some other similar specification mechanism.

Generally, each block's description is prefaced by a method code that specifies the type of compression for the given block, as well as whether to expect four child codewords (ie., the four subquadrants of the current block). Thus, in one embodiment, the codes are interspersed in a depth-first fashion. According to various embodiments, eight possibilities for types of compressions are as follows:

1) Do nothing and do not split
2) Apply 1-1 fractal code and do not split
3) Apply 2-1 fractal code and do not split
4) Apply recursive motion vector and do not split
5) Do nothing and split
6) Apply 1-1 fractal code and split
7) Apply 2-1 fractal code and split
8) Apply recursive motion vector and split One embodiment of the present codec 10 utilizes three codebooks to code the compression method. One codebook is for the top-level blocksize, one is for the middle blocksizes, and one is for the bottom blocksizes. If iterations have reached the minimum blocksize, options 5-8 listed above are generally not available, and therefore are not provided with Huffman codes. At the top level, options 4 and 8 are generally not available (i.e. every block is assigned a motion vector at top level, and therefore there is no reason to specify one in the code stream).

For intraframes, the same table that is used for top-level blocks may be used for compression, as motion vectors are inapplicable (as discussed in greater detail below).

Intraframes

As noted earlier, compression of I-frames generally requires more bits than P-frames because there is no base information to describe the I-frame. To this end, embodiments of the present codec 10 allocate more bits (preferably triple the bits, but other values are possible) to the frame. Additionally, some embodiments define I-frames less frequently than is the case in a typical MPEG stream. While the I-frame calculation in the present codec 10 maintains its decompression simplicity, it tends to be relatively less efficient in rate-distortion terms than other, more conventional algorithms. However, the coding of I-frames can be dealt with completely separately from predictive frames, and therefore, it is possible to deploy a hybrid algorithm that uses the described codec for the P-frames and a complementary approach for the I-frames Intraframes in one embodiment of the present codec 10 are analyzed by reducing the frames to a previously-solved case. Stated a different way, compressing I-frames is reduced to a similar methodology as that of P-frames by assuming that there is an all-gray (128,128,128) frame immediately preceding the given I-frame. Of course, in doing so, the system does not need to "send" any bits to represent motion vectors, and it does not make any use of recursive motion vectors, but all other steps and processes are exercised.

In an alternative embodiment, the given I-frame is compressed as if it had been coded as a gray frame followed by more than one copy of the target frame. This approach often leads to an increase in I-frame quality (but at the cost of some decompression speed). This method allows the frame to "warm up" (ie., converge to a final approximation) over multiple iterations. The interpolated frames are then flagged in their respective headers to indicate that they are intended for the decompressor 125, 135 to use to describe the final frame, and that they are not intended to be displayed.

Smooth Region Correction

A type of artifact that is sometimes noted in conventional codecs is a tendency to have visible artifacts in areas of low variance, but ones that are not completely smooth, such as fine textures. To compensate for these areas, embodiments of the present codec 10 compute the variance in the top level block, and artificially lower the λ used on that block for all subsequent calculations by a factor proportional to the variance, provided the variance falls below a set threshold. In one embodiment, desired results are obtained if high variance blocks are not similarly penalized, and low variance blocks are merely given a boost. Coupled with the existing rate control mechanisms, this technique smoothly flows bits from all the unaffected pixels to the problem areas.

A similar technique to that described above can be used in conjunction with segmentation algorithms to specify regions of interest. Thus, this technique could be used, for example, in conjunction with face detection algorithms, or coupled with an algorithm that measures the temporal persistence of objects and therefore added bits to objects likely to persist. As will be understood, this smooth region correction technique has many practical applications.

Parallel Compression

According to one embodiment, parallelism is achieved in the compressor 200 by recognizing that periodic I-frames separate the video into discrete groups, each of which has a compression that is entirely separate from the other groups. For example, if a given video has frames structured as: I,P,P, . . . , P,I,P,P,P, . . . , P,I . . . .
assuming, for example, nine P-frames between each I-frame, frames 1-10 can be considered one compression task, frames 11-20 a second task, and so on.

In one embodiment, the existence of a registry of all needed compression jobs is assumed, and the registry is protected by a locking data structure against concurrent modification by multiple threads. Once the registry is assumed, the codec 10 can then structure the code to, in parallel, obtain the lock on the registry, determine the next available compression job and mark it as taken, and compress the given subsequence to a temporary location. Utilizing this approach, there is generally one remaining thread which scans this assumed list to determine when different segments of video become available, and then copies the temporary buffers to the main stream. Apart from a trivial amount of contention around the registry structure, this technique keeps the worker threads (or processes) maximally busy.

Decompression

Parallel Decompression

The fractal codec 10 described herein presents unique challenges for compression, decompression, and other related processes, especially in a multiprocessor environment. In order to combat some of these challenges, a great deal of parallelism may be achieved (on the compression side) via the processes described below. The techniques described herein have been simulated via the OpenMP library (see http://www.openmp.org/drupal/), which is a platform-independent set of routines to facilitate parallelism. By using parallelism, the decompression problem is divided into a number of subtasks, each of which can be executed on a separate thread and potentially by a separate processor.

Generally, the present system considers a decompressed frame as comprising rows of blocks labeled 1 . . . N. The techniques described herein could be employed block by block. Preferably, however, the decompression technique is used wherein each "row" actually represents several rows to make the parallelism less fine-grained. According to one embodiment, to achieve decompression, each row must undergo steps:
1) DMV(i)—decompress Huffman codes describing the motion vectors for row i.
2) AMV(i)—apply the decompressed motion vectors to the previous frame for row i.
3) DFC(i)—decode and apply fractal codes to row i.
4) CP(i)—depending on the architecture of the codec 10, there is, in some embodiments, a required step to copy the final pixels to a destination buffer, which is often memory on a video card.

Preferably, embodiments of the present codec 10 employ a pool of threads to execute each of these tasks in parallel. Alternatively, these tasks are added to a queue of jobs, and a pool of threads pulls from the queue as needed. However, there are dependencies that should be respected by means of locks. Specifically:

1) DMV(i)→DMV(i+i)—the Huffman codes form a continuous stream and therefore should be decoded in order.
2) DMV(i)→AMV(i)—a motion vector should be decoded before it can be applied.
3) AMV(n)→DFC(1)—all motion vectors should be decoded prior to applying fractal codes. This restriction can actually be loosened in some embodiments, however, as described below.
4) DFC(i)→DFC(i+1)—rows of fractal codes should be applied in sequence.
5) DFC(i)→CP(i)—a row can be copied once it has had its fractal codes applied.

In one embodiment, these restrictions are enforced is setting up a series of locks, MVLCK(i) for motion vector locks and FCLCK(i) for fractal code locks. Generally, all locks start in a locked state. One thread handles the Huffman decoding and executes step DMV(i) in succession, and after it executes DMV(i) it releases lock MVLCK(i). A series of threads block on MVLCK(i), and, as soon as it is possible, execute AMV(i). Generally, these threads will execute in parallel.

Next, the process waits until all motion vectors have been applied. The last motion vector thread unlocks lock FCLCK (0). Then, a series of threads waits on FCLCK(i), decodes the fractal codes, applies the fractal codes, and unlocks FCLCK (i+1). This thread then executes CP(i), whose execution can therefore overlap the computation of row i+1.

Embodiments of the present codec 10 can improve parallelism by noting that it is not always necessary for the fractal codes to be decoded for all motion vectors to have been applied, but only those that can be relevant to the decoding of fractal codes. Given the default radius of four in all directions for fractal codes, decoding of the first row may be possible soon after the motion vectors have been applied. To be maximally efficient, the system 10 most logically involves yet another set of locks to determine when a row of blocks has completed, step AMV(i).

In one embodiment, further parallelism is achieved by assuming that a given frame is divided into regions that do not have any dependencies. The simplest way of implementing this is to define that no fractal code from one region can affect a code from another region (note this restriction affects only 1-1 and 2-1 codes, as all regions depend on the same motion-compensated screen). A more sophisticated approach is to duplicate memory such that the fractal codes are unrestricted, but the changes made to a region are guaranteed not to affect the subsequent regions, as they are considered to use their own copies of the bordering regions. In this scenario, the steps DFC(i) would read from a common location, but write to a location determined by their region. However, this change would also have to be implemented in the compressor 125, 135. As aside effect, this scheme also provides an alternate, liner-grained method to parallelize the compressor.

By utilizing the parallel decompression method described above, decompression speeds are generally much faster than those of conventional codecs. Additionally, as multiprocessors become more prevalent, decompression efficiency and speed can be further improved according to embodiments of the present codec 10.

Multiscale Decompression

An alternate approach to parallel decompression is multiscale decompression. This approach decompresses the same bit stream at different resolutions. At the lowest level, all the transformations used (1-1, 2-1, motion vector, etc.) have no explicit dependence on the size of the blocks involved. Therefore, an embodiment of the system 10 may attempt to apply the same stream to a buffer of a different size.

As will be understood, the addresses describing the offsets of the block to be addressed need to make sense in the current coordinate system (one could, however, at extra computational expense, interpolate to allow for blocks with fractional offsets). It must be additionally determined that no pixel exceeds the bounds 0-255. Therefore, apart from the naïve implementation of scaling, which is merely the conventional and trivial form of applying a still-frame zooming technique to each frame after it has been decompressed, an embodiment of the compressor 125, 135 adds the possibility of compressing frames larger (by an integer factor) than the smallest resolution of interest, and making sure that all addresses are specified, in multiples of the ration between the largest and smallest displayed frame. Preferably, this is accomplished with a multiple of two, but other multiples are possible. By keeping careful track, the system 10 ensures a resultant decompressed stream that has the property that the result of downsampling the larger frames by averaging 2×2 blocks would lead to the same stream as if it were decompressed at the lower resolution.

In another embodiment, these techniques are adapted to provide greater efficiency and ease of use. For example, clamping is practical and may be used, and also I-frames limit the distance any possible artifact can travel. Fractional interpolation is additionally available. However, system users must weigh multiscale decompression with the trivial alternative, which is to rescale each decompressed frame on output.

Huffman Table Generation

As described earlier, embodiments of the compressor 200 rely on a large set of static Huffman codes giving codewords for describing the compression method, address, and q-value. Additionally, there are at least three separate method table's, as also described earlier. Further, in some embodiments, it is profitable (ie., more efficient and leads to better compression) to compute tables for I-frames and P-frames separately.

The techniques for computing Huffman codes from a set of frequencies are well known (see Weisstein, Huffman Coding). The starting point of the Huffman algorithm is a vector of probabilities:

$$(p_1, p_2, \ldots, p_n)$$

summing to 1. However, embodiments of the present codec 10 employ an additional and efficient way to decompress these codes comprising setting up a look-up table on the decompressor 125, 135 whose size is dependent on the size of the maximum possible length of a code for a given codebook. Therefore, at the cost of some optimality, the system is able to ensure that the longest Huffman code, which corresponds to the least probable symbol, is kept within desired bounds. This is accomplished by computing the Huffman codes that would be generated by a set of frequencies $(f_1, \ldots, f_n)$, and if the longest code exceeds a given target, the set of frequencies are successively replaced by $(f_1+k, \ldots, f_n+k)$ for successively larger values of k. Generally, the desired value of k can be determined by bracketing.

The end result of the Huffman generation algorithm within embodiments of the present system is a codebook consisting of strings of zeroes (0's) and ones (1's) assigned to each of the n possibilities. The goal is to minimize the sum of $p_i l_i$, where the latter term refers to the length of the code vector. Furthermore, it is assumed that none of the code vectors forms the prefix of any of the others.

It is also a well-known technique to perform decompression of Huffman codes by forming a look-up table whose size depends on the maximum length of the codewords. Embodiments of the present codec 10, however, modify the Huffman codes to a set that is not ideally optimal in the sense of minimizing expected code length, but which have a manageable tail (i.e. least probably element). This is accomplished by repeatedly adding one to each of the frequencies in the generated list, and running the Huffman algorithm on the new set of lengths. This technique has the effect of flattening the probabilities slightly (in the general scheme the frequencies are large numbers). This technique is iterated until the smallest Huffman code is under a fixed cut-off. This technique generally avoids the situation in which the Huffman algorithm assigns (optimal) long codes to improbable choices.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A method for compressing video data, comprising the steps of:

selecting a current video frame of the video data, wherein the video frame is comprised of a plurality of pixels;

dividing the current video frame into a plurality of blocks, wherein each block is comprised of M×N of the plurality of pixels;

in a first iteration, approximating the blocks of the current frame based on motion vectors associated with corresponding blocks from the previous frame of the video data;

in a second iteration, further refining the blocks of the current frame by determining optimal motion vectors for the blocks of the current frame based on the motion vectors (i) provided by the corresponding blocks from the previous frame, (ii) provided by the surrounding blocks in the current frame, and (iii) provided by successively smaller blocks from the current frame; and wherein the optimal motion vectors for the blocks of the current frame are optimized to balance distortion and rate, wherein the optimal motion vectors are represented by codewords generated from Huffman tables, wherein the optimal motion vector for a respective block of the current frame is optimized by ranking candidate motion vectors from neighboring blocks higher than other blocks and from neighboring blocks with a similar motion vector higher than other neighboring blocks, and wherein ranking of candidate motion vectors is determined by the formula $C=D+(\lambda)R+(\mu)V$ wherein C equals cost associated with each possible motion vector, D equals distortion, R equals rate, $\lambda$ is a non-negative value that is modifiable based on desired tolerance values, V is an amount by which a velocity vector differs from the mean of the velocity vectors above, below, to the left, and to the right of the motion vector of the respective block, and $\mu$ is an arbitrary constant.

2. The method of claim 1, wherein the blocks of the current frame are optimized to balance distortion (D) and rate (R) according to the formula of $D_1+(\lambda)R_1<D_2+(\lambda)R_2$ wherein lambda (λ) is a Lagrangian multiplier, wherein λ is a non-negative value that is modifiable based on desired tolerance values, wherein distortion (D) represents differences between an original pixel value and a corresponding reconstructed pixel value of the current frame, and wherein rate (R) represents number of bits in the current frame.

3. The method of claim 2, wherein an initial value for λ is selected for the current frame based on the λ used for the prior frame.

4. The method of claim 1, wherein simulated annealing prevents the selection of optimal motion vectors that are optimal locally but not globally for the current frame.

5. The method of claim 1, wherein the pixels are converted from RBG to YUV values.

6. The method of claim 1, wherein μ is preferably set to a value of 1.

7. The method of claim 1, wherein calculation of C=D+(λ)R+(μ)V allows for the selection of the optimal motion vector for the respective block minimizes visual swimming effect when the respective block is decompressed and viewed by a human.

8. The method of claim 1, wherein optimal motion vectors are assigned to blocks of differing sizes for the current frame.

9. The method of claim 1, wherein optimal motion vectors are assigned to blocks of identical sizes for the current frame.

10. The method of claim 1, wherein codewords for the current frame are included in a codebook.

11. The method of claim 10, wherein multiple codebooks are associated with the current frame and wherein each codebook corresponds with blocks of differing sizes for the current frame.

* * * * *